July 6, 1943.　　　W. W. DONELSON　　　2,323,461
SPARKPROOF FLOORING
Filed Oct. 30, 1941
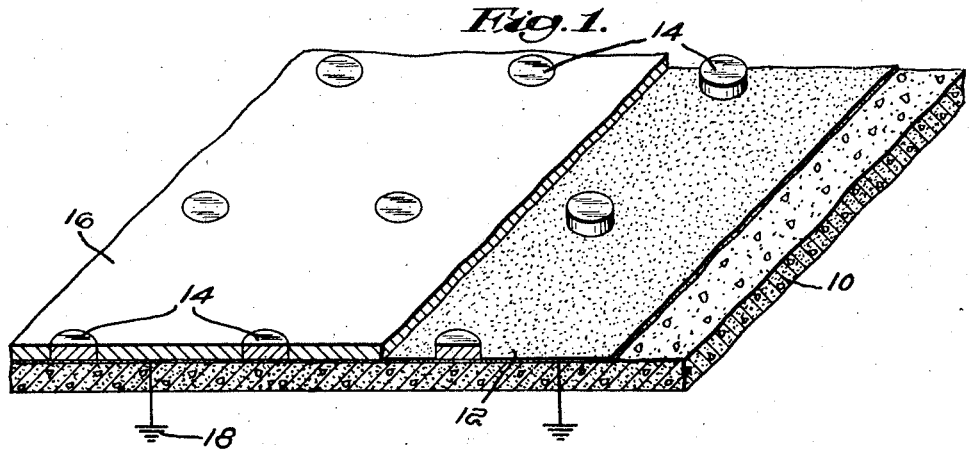
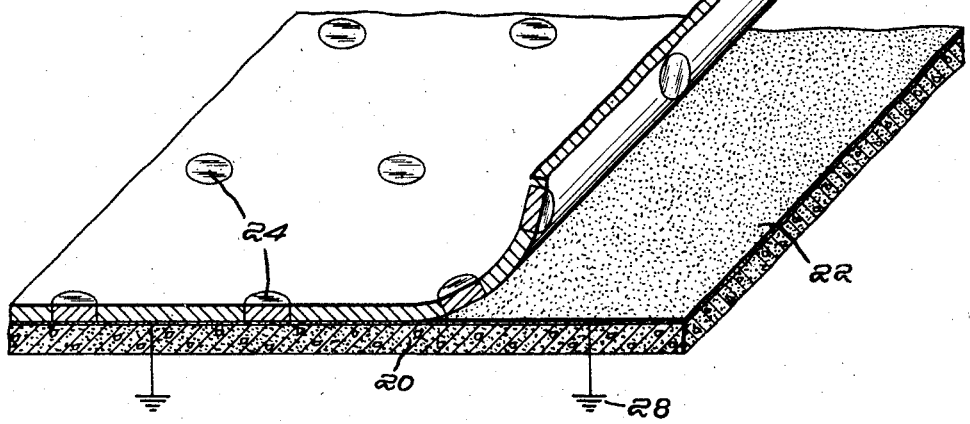
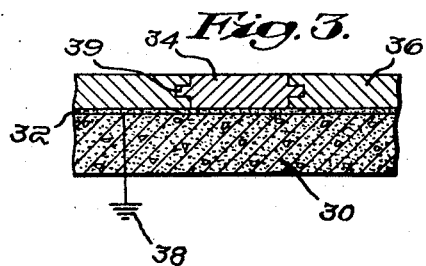
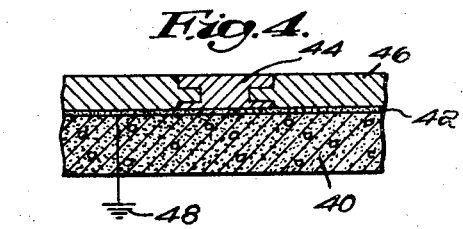
Inventor:
William W. Donelson,
by Kenway & Witter
Attorneys Patented July 6, 1943

2,323,461

UNITED STATES PATENT OFFICE 2,323,461

SPARKPROOF FLOORING

William Warren Donelson, Boston, Mass., assignor to The Federal Flooring Corporation, Boston, Mass., a corporation of Massachusetts Application October 30, 1941, Serial No. 417,144

3 Claims. (Cl. 175—264)

This invention relates to sparkproof flooring and more particularly concerns a novel and economical flooring especially adapted to conduct to the ground static electrical charges from articles coming in contact with the floor, thereby eliminating these charges and the dangers they present. An important feature of the invention resides in the flooring construction which is such that the flooring can comprise various materials having various characteristics desired. The primary object of the invention is the production of an improved sparkproof flooring at minimum cost which will embody these and other desirable characteristics.

Sparkproof flooring is employed for industrial purposes which require very extensive floor areas and the cost of production, in both material and labor, is therefore of prime importance. I have discovered that great economy in the production of such flooring is secured by employing a relatively thin layer of conductive material, such as conductive rubber cement or paste, on the sub-floor and placing thereon a top floor together with conductive studs in contact with the conductive material and so spaced and exposed at the top surface of the flooring that objects resting on or moving over the flooring come in contact therewith and thereby have static charges immediately dissipated therefrom. The conductive studs can be placed adhesively on the conductive material and plastic flooring composition spread thereover in a manner exposing the studs at the top flooring surface, or the studs can be previously placed within prepared top flooring, such as rubber, linoleum, tiling, etc., and the combined top flooring and studs thereafter placed onto the layer of conductive material, all as hereinafter more specifically described. The production of a novel sparkproof flooring of this nature comprises a further object of the invention.

These and other features of the invention will be best understood and appreciated from the following description of preferred embodiments thereof selected for purposes of illustration and shown in the accompanying drawing wherein:

Fig. 1 is a fragmentary view of a flooring constructed in accordance with one embodiment of the invention, portions thereof being broken away to illustrate the process of construction, Fig. 2 is a like view of a modified construction, Figs. 3 and 4 illustrate modifications of the construction shown in Fig. 2.

Referring first to Fig. 1 of the drawing, 10 indicates the sub-floor which is preferably of concrete. In accordance with my invention I render the top surface of the sub-floor electrically conductive by placing a thin layer of conductive material thereover at 12. The material which I prefer to employ is conductive rubber and this can be applied like a paint with a brush or as a paste with a trowel to provide a coating 1/100" to 1/50" thick, although a thin pre-fabricated sheet of conductive material can be employed if desired. Other conductive materials which will serve the purpose can be used, such as a conductive asphalt paste or conductive gum pastes. These conductive liquids or pastes can be formed by adding a conductive filler, as graphite, carbon or powdered coke, to a base of liquid rubber, asphalt or gums, together with a suitable solvent. The coating will preferably be of an adhesive nature whereby to adhere to conductive disks or studs 14, preferably of non-ferrous metal, which are placed on the conductive coating in a pre-arranged relation, or the bottom faces of the studs can be coated with a conductive adhesive before placing the same in contact with the conductive coating. The flooring is then finished by applying a top flooring 16 of plastic composition on and over the coating 12. This composition can be of magnesite, asphalt or other suitable material which will take wear and not spark from impact. The conductive coating 12 is preferably grounded at several locations 18 suitably spaced to facilitate dissipation of static charges.

It may in some cases be desirable to employ pre-fabricated top flooring such as rubber flooring, linoleum, asphalt, tile, etc., all of which are sparkproof from impact, and my invention is well adapted thereto. In such case the conductive coating 22 is applied to the sub-floor 20, as above described, and the previously prepared top flooring 26 is laid thereonto. The top flooring can be conveniently prepared in the shop by perforating the flooring and inserting studs or disks 24 frictionally within the perforations. The disks are exposed at and substantially flush with both faces of the flooring so that the bottom face will contact with the conductive layer 22 and the top face will be exposed when the top flooring is laid in place. The conductive coating should be of an adhesive nature whereby to bond with the top flooring or, if not adhesive, the bottom face of the top flooring can be coated with a conductive adhesive to make it adhere to the conductive coating. The conductive coating 22 is grounded at 28.

While the frictional mounting of the studs 24 within the top flooring 26 is most simple and convenient, it is possible to mount them more permanently if desired. For example in Fig. 3 the studs 34 are illustrated as having centrally located fins 39 whereby the rubber or asphalt flooring 36 can be molded in holding relation onto the studs. The conductive layer 32 is applied to the sub-floor 30 in the manner above described and is grounded at 38. In Fig. 4 is illustrated a stud 44 which has been riveted into the flooring 46 of the linoleum or the like. Either or both ends of the rivet body can be upset over the flooring and the overlapping top portion will preferably be somewhat thicker to provide a suitable wearing surface. The conductive layer on the sub-floor 40 is indicated at 42 and is grounded at 48.

The application and advantages of my improved sparkproof flooring will be readily apparent. The studs, which can be of any suitable conductive material, as brass, copper, bronze, conductive rubber, etc., are spaced sufficiently close to be contacted by objects resting on or moving over the floor and function directly to dissipate static charges therefrom with a minimum of resistance. Furthermore, the top flooring and studs are of materials which will not spark on impact, the flooring therefore being sparkproof from both impact and static sources. The relative simplicity and economy of this novel flooring, as well as its adaptability to top floors of various materials, will also be readily apparent and appreciated. Both the conductive coating and the top flooring can be relatively thin whereby effecting great economy in the construction.

Having thus described my invention what I claim as new and desire to secure by Letters Patent of the United States is:

1. Sparkproof flooring comprising a sub-floor, a thin layer of conductive material on and covering the sub-floor, a top flooring on and covering the conductive material, and conductive studs extending through the top floor and in contact with the conductive material, the studs being in a predetermined and relatively close relationship and their top surfaces being substantially flush with the top surface of the flooring.

2. Sparkproof flooring comprising a sub-floor, a thin layer of conductive material on and covering the sub-floor, a top floor in face to face bonded contact with and covering said layer, and studs of conductive non-ferrous metal extending through the top floor and in contact with the conductive layer, the studs being in a predetermined and relatively close relationship and their top surfaces being exposed at the top surface of the flooring.

3. A prefabricated sparkproof top flooring, comprising a relatively thin sheet of flexible flooring material, and electro-conductive studs in predetermined and relatively close relationship therein, the studs being exposed at and substantially flush with both faces of the sheet and the flooring being adapted for use with a grounded conductor located therebeneath and in contact with the studs.

WILLIAM WARREN DONELSON.